United States Patent
Iwamura et al.

(10) Patent No.: US 8,548,471 B2
(45) Date of Patent: Oct. 1, 2013

(54) USER APPARATUS, BASE STATION APPARATUS AND METHOD USED IN MOBILE COMMUNICATION SYSTEM

(75) Inventors: Mikio Iwamura, Yokohama (JP); Minami Ishii, Yokohama (JP); Atsushi Harada, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 489 days.

(21) Appl. No.: 12/531,607

(22) PCT Filed: Mar. 18, 2008

(86) PCT No.: PCT/JP2008/054998
§ 371 (c)(1),
(2), (4) Date: Nov. 19, 2009

(87) PCT Pub. No.: WO2008/114796
PCT Pub. Date: Sep. 25, 2008

(65) Prior Publication Data
US 2010/0087197 A1    Apr. 8, 2010

(30) Foreign Application Priority Data
Mar. 20, 2007   (JP) ................................. 2007-073737

(51) Int. Cl.
*H04W 36/00*   (2009.01)

(52) U.S. Cl.
USPC .............. 455/436; 455/432.1; 455/435.1; 455/437; 455/438; 455/439; 455/440; 455/441; 455/442; 455/443; 455/444; 370/310.2; 370/331; 370/332; 370/333; 370/334; 370/338

(58) Field of Classification Search
USPC ........ 455/432.1, 435.1, 436–444; 370/310.2, 370/331–334, 338
See application file for complete search history.

(56) References Cited

U.S. PATENT DOCUMENTS 5,870,673 A * 2/1999 Haartsen ..................... 455/426.1
7,110,765 B2 * 9/2006 Amerga et al. ............... 455/436

FOREIGN PATENT DOCUMENTS

| JP | 11-088945 A | 3/1999 |
| JP | 2003-509982 A | 3/2003 |
| JP | 2003-264862 A | 9/2003 |
| JP | 2005-537752 A | 12/2005 |
| WO | 2006/118158 A1 | 11/2006 |

OTHER PUBLICATIONS

International Search Report w/translation from PCT/JP2008/054998 dated May 1, 2008 (4 pages).
Written Opinion from PCT/JP2008/054998 dated May 1, 2008 (3 pages).

(Continued)

*Primary Examiner* — Steve D Agosta
(74) *Attorney, Agent, or Firm* — Osha Liang LLP (57) ABSTRACT

A user apparatus in a mobile communication system includes: a unit configured to receive a downlink control signal using a frequency of a residing cell; and a unit configured to perform cell search using a frequency different from the frequency of the residing cell during an interval between reception timings of the downlink control signal in response to an occurrence of a predetermined event for different frequency measurement in the user apparatus or a base station apparatus. When the reception timing interval of the downlink control signal is not longer than the threshold reported from the base station apparatus, and when the predetermined event for different frequency measurement occurs in the user apparatus or the base station apparatus, different frequency measurement is performed in a cycle, different from the reception timing interval, reported from the base station apparatus.

10 Claims, 8 Drawing Sheets

(56) References Cited

OTHER PUBLICATIONS

3GPP TS 25.331, V7.3.0; "Protocol Specification"; Dec. 2006 (1302 pages).

3GPP TS 25.304, V7.1.0; User Equipment (UE) procedures in idle mode and procedures for cell reselection in connected mode; Dec. 2006 (38 pages).

3GPP TS 36.300, V1.0.0; "Evolved Universal Terrestrial Radio Access (E-UTRA) and Evolved Universal Terrestrial Radio Access Network (E-UTRAN); Overall description"; Mar. 2007 (82 pages).

Japanese Office Action for Application No. 2007-073737, mailed on Oct. 11, 2011 (4 pages).

Sharp, "Measurement Gap Control for E-UTRAN", 3GPP TSG-RAN WG2#55, R2-062928, Seoul, Korea, Oct. 9-13, 2006.

Sharp, "Measurement Gap Control for E-UTRAN", 3GPP TSG-RAN WG2#56, R2-063283, Riga, Latvia, Nov. 6-10, 2006.

NTT DOCOMO, Inc., "UE Measurement Requirements in LTE", 3GPP TSG-RAN WG2 #56bis, R2-070275, Jan. 15-19, 2007, Sorrento, Italy.

\* cited by examiner

USER APPARATUS, BASE STATION APPARATUS AND METHOD USED IN MOBILE COMMUNICATION SYSTEM

TECHNICAL FIELD

The present invention relates to a user apparatus, a base station apparatus, and a method used in a mobile communication system.

BACKGROUND ART

In this type of technical field, it is proposed to perform handover among a plurality of radio access networks or mobile communication systems based on same or different types of radio access technologies (RAT). For example, it can be considered that, after a user apparatus completes a telephone call in a radio access network, the user apparatus enters waiting operation in another radio access network of a different frequency. By doing that, when the radio access network is becoming congested, load balancing of the network can be achieved, so that the accommodation number and the throughput in the whole of the plurality of systems can be improved.

Figure 1:
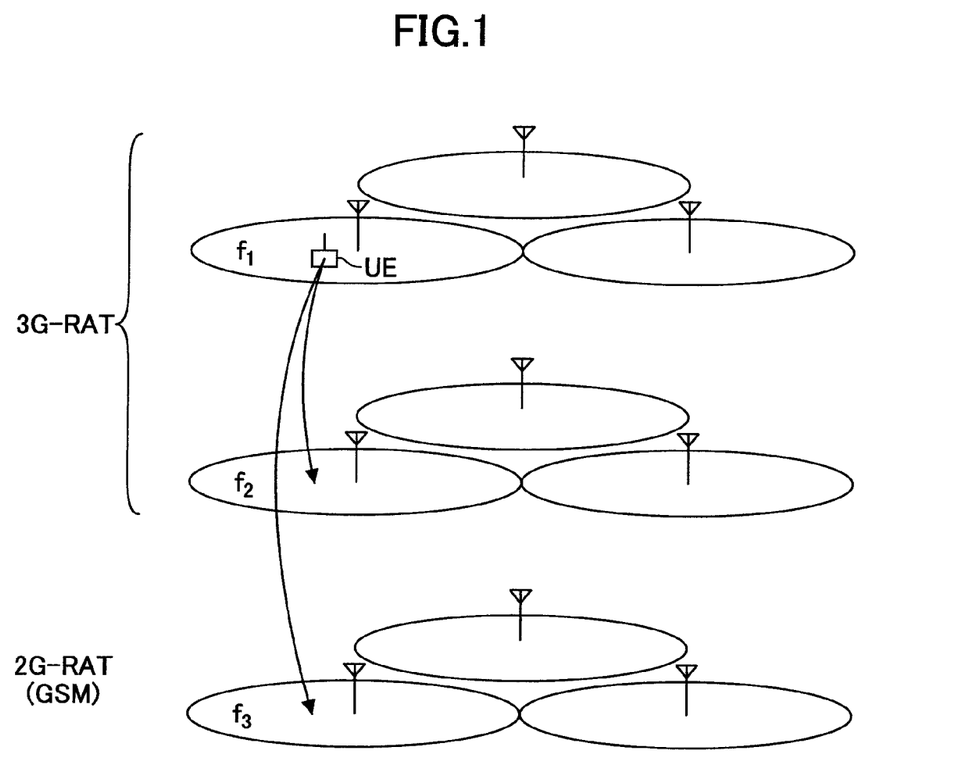
FIG. 1 shows the concept of multiple RAT handover.

FIG. 1 shows a situation in which handover is performed among the same or different RATs. In the example shown in the figure, a third generation system (3G-RAT) including a radio access network of a first frequency $f_1$ and a radio access network of a second frequency $f_2$ coexists with a second generation system (2G-RAT) that uses a third frequency $f_3$ which is different from them in a similar geographical area. The 2G-RAT may include a system such as GSM and PDC, for example. In the example shown in the figure, a user apparatus UE that completes a telephone call using the first frequency $f_1$ enters waiting operation in the second frequency $f_2$ or in the 2G-RAT. A handover may be performed between a system of the long term evolution (LTE) scheme and a system of the UMTS scheme.

For example, the non-patent documents 1 and 2 disclose handover among the same or different types of RATs.
[Non-patent document 1] 3GPP, TS25.331
[Non-patent document 2] 3GPP, TS25.304

DISCLOSURE OF THE INVENTION

Problem to be Solved by the Invention

In order to perform handover to a cell of a different frequency and/or a different RAT, it is necessary to perform different frequency measurement including cell search and the like for the different frequency and/or different RAT before handover. The term of "different frequency measurement" in the present application is a concept including cell search in a different frequency and a cell search in a different RAT.

Since the different frequency measurement is related to mobility control, it is desirable to perform the different frequency measurement a plurality of times instead of only once such that instantaneous variation components can be adequately averaged. Thus, when the user apparatus enters a discontinuous reception mode (DRX) and when an event of different frequency measurement occurs, the user apparatus performs the different frequency measurement during an interim of discontinuous reception timings. In the different frequency measurement, it is necessary to tune to a frequency different from a frequency of the residing cell, perform cell search, detect a synchronization channel, and measure a reception level so as to tune to the frequency of the residing cell again. Therefore, it is desirable that the discontinuous reception cycle is long such that the different frequency measurement can be performed (equal to or greater than 5 ms, for example).

On the other hand, the discontinuous reception cycle is set mainly from the viewpoint of battery saving of the user apparatus. For example, when data to be sent or received does not exist for more than a predetermined time, battery saving can be realized by performing DRX. DRX is applied to reception of a paging channel in an idle state (waiting state) in a system such as UMTS, for example. In the LTE, there is context of the user apparatus in a base station, and it is studied to apply DRX also to an active state in which radio bearer is set. By applying DRX in the active state, data send and receive can be restarted without performing signaling with an upper node, so that data transfer delay can be reduced. On the other hand, since the receiver can be laid to rest by using DRX, battery saving can be realized.

Therefore, there is a case in which the cycle of the discontinuous reception performed by the user apparatus is not long enough to perform different frequency measurement. When the discontinuous reception cycle is short, the different frequency measurement cannot be fully performed, so that handover to a cell of a different frequency becomes difficult, and there is a fear that it affects data throughput and system capacity.

An object of the present invention is to give opportunities for performing different frequency measurement to the user apparatus with reliability.

Means for Solving the Problem

In the present invention, a user apparatus in a mobile communication system is used. The user apparatus includes: a unit configured to receive a downlink control signal using a frequency of a residing cell; and a unit configured to perform cell search using a frequency different from the frequency of the residing cell during an interval between reception timings of the downlink control signal in response to an occurrence of a predetermined event for different frequency measurement in the user apparatus or a base station apparatus. According to a result of comparison between a reception timing interval of the downlink control signal and a threshold that is reported from the base station apparatus, it is determined whether different frequency measurement is performed in a cycle, different from the reception timing interval, reported from the base station apparatus when the predetermined event for different frequency measurement occurs.

Effect of the Invention

According to the present invention, opportunities for different frequency measurement can be provided to the user apparatus with reliability.

DESCRIPTION OF REFERENCE SIGNS 101 reception RF unit
103 control information generation unit
105 RRC processing unit
107 broadcast information generation unit
109 transmission RF unit
201 reception RF unit
203 L1/L2 processing unit
205 RRC processing unit
207 control unit
209 measurement unit
211 transmission RF unit Preferred Embodiments for Carrying Out the Invention Although the present invention is described while being classified to some embodiments for the sake of convenience of explanation, the classification to each embodiment is not a substantial matter, and one or more embodiments may be used as necessary.

[Embodiment 1]

Figure 2:
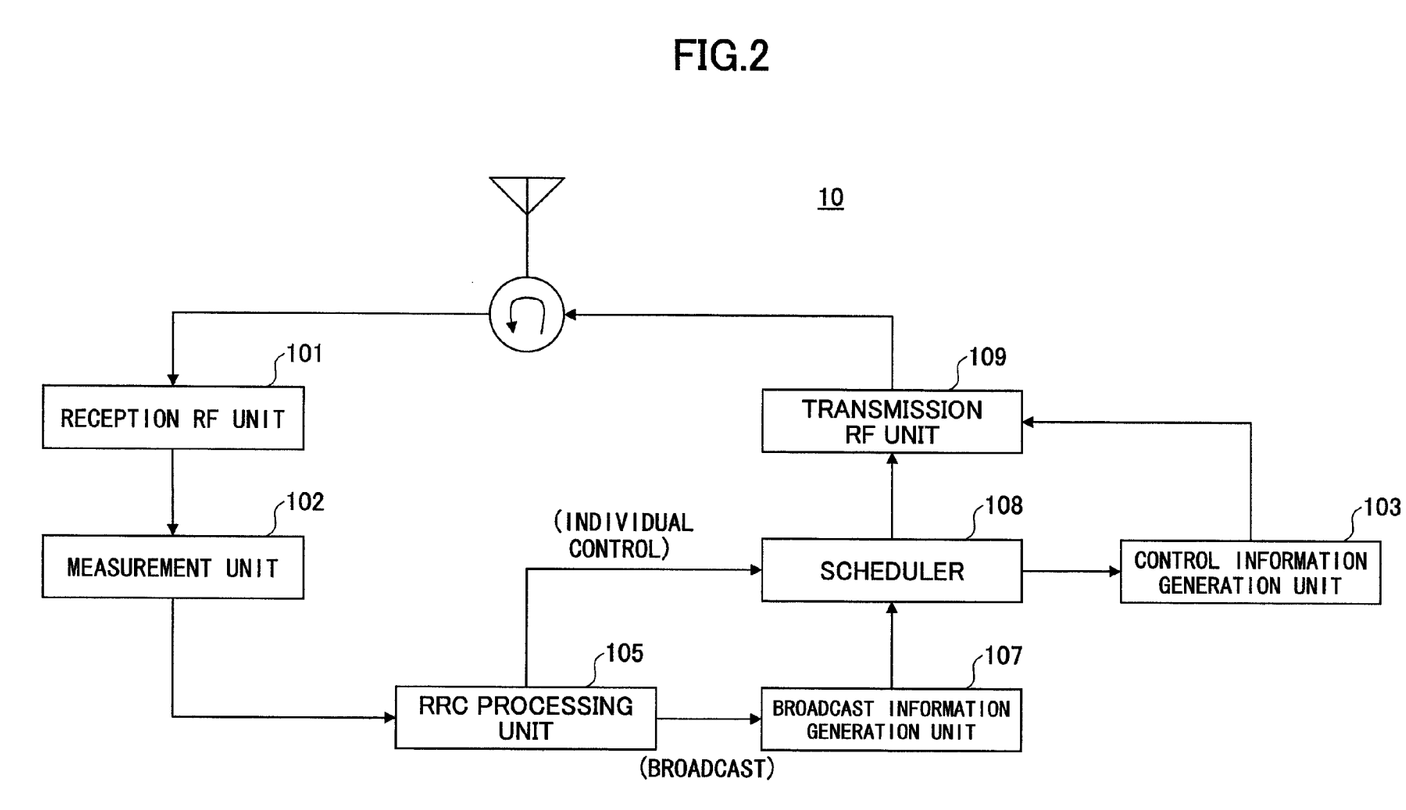
FIG. 2 shows a schematic block diagram of a base station apparatus used in an embodiment of the present invention.

FIG. 2 shows a schematic block diagram of a base station apparatus 10 used in an embodiment of the present invention. FIG. 2 shows a reception RF unit 101, a measurement unit 102, a control information generation unit 103, an RRC processing unit 105, a broadcast information generation unit 107, a scheduler 108 and a transmission RF unit 109.

The reception RF unit 101 performs, on a signal received via an antenna and a duplexer, processing such as power amplifying, band limitation, frequency conversion, analog digital conversion, demodulation and the like.

The measurement unit 102 measures quality of the uplink based on a sounding reference signal reported from the user apparatus. The quality of the signal may be measured as desired signal power to interference signal power ratio (SIR, SINR and the like), reference signal received power (RSRP), channel quality indicator (CQI), path loss and the like. Averaging of the quality measurement values is performed for removing effect of instantaneous fading to an extent of following shadowing and distance attenuation and the like.

The control information generation unit 103 generates information of L1/L2 control channel according to an assignment result of the scheduler 108.

The RRC processing unit 103 performs processing on radio resource control (RRC). The RRC processing unit 105 performs monitoring occurrence of a predetermined event, generating measurement control, generating a gap control signal (described later), generating a gap stop signal (described later), managing a threshold on the cycle of discontinuous reception performed in the user apparatus, managing the cycle of discontinuous reception performed in the user apparatus, and processing of L3 control and the like. In general, the predetermined event is performed by comparing a measurement value based on a received signal or a value reported from the user apparatus with a predetermined threshold, and by checking whether the value is greater or less than the threshold.

The broadcast information generation unit 107 generates a broadcast channel (BCH) including information to be broadcasted to user apparatuses in the residing cell.

The scheduler 108 schedules assignment of radio resources for user apparatuses.

The transmission RF unit 109 generates a downlink signal including a broadcast channel, an individual control channel, a shared data channel (PDSCH) and the like. The downlink signal is transmitted through the duplexer and the antenna after various processing is applied by the transmission RF unit 109. The processing includes digital analog conversion, modulation, frequency conversion, band limitation, power amplification and the like.

Figure 3:
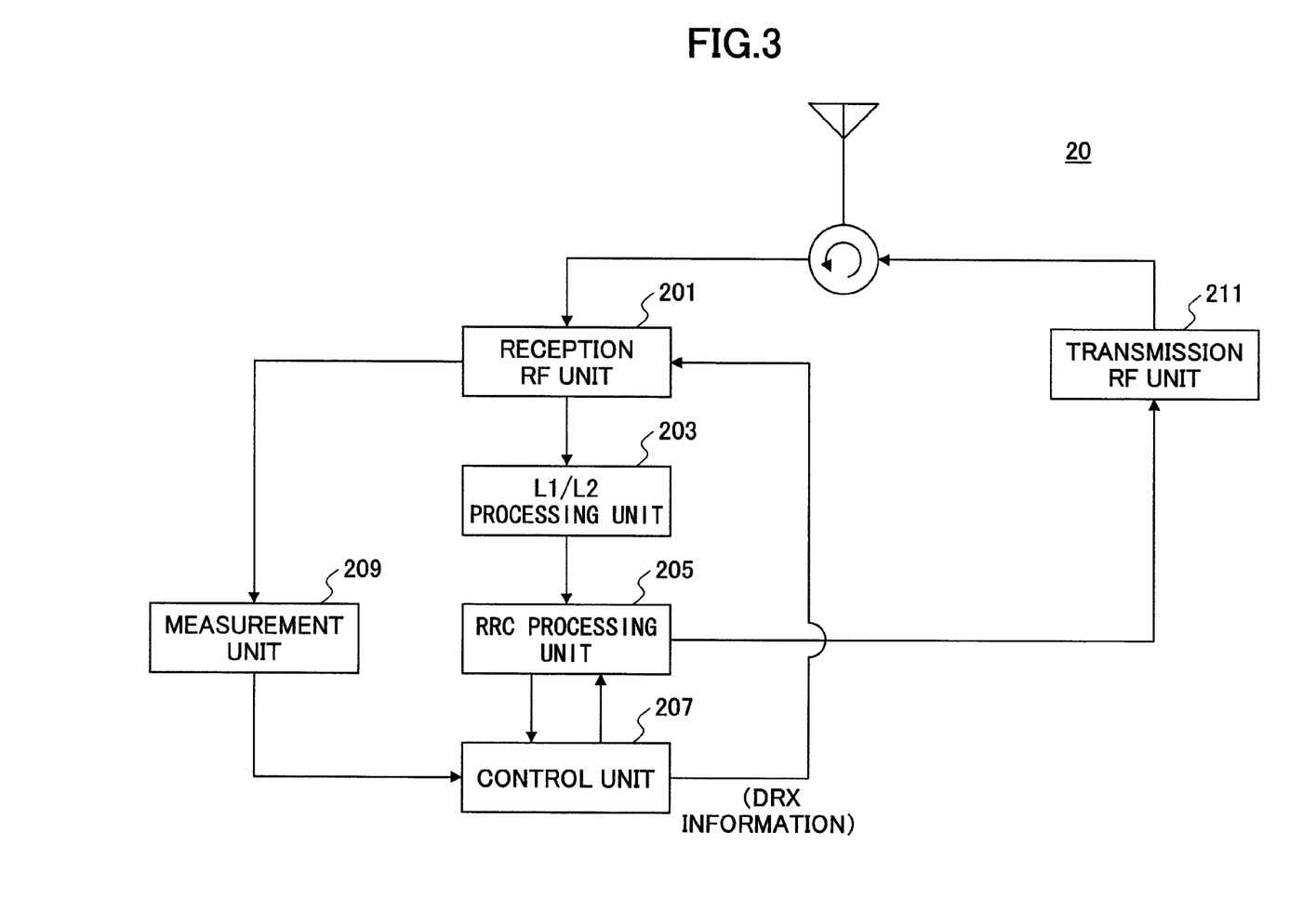
FIG. 3 shows a schematic block diagram of a user apparatus that is used in an embodiment of the present invention.

FIG. 3 shows a schematic block diagram of the user apparatus 20 that is used in an embodiment of the present invention. FIG. 3 shows a reception RF unit 201, a L1/L2 processing unit 203, an RRC processing unit 205, a control unit 207, a measurement unit 209 and a transmission RF unit 211.

The reception RF unit 201 properly processes a radio received signal, and extracts a reference signal (pilot signal), a broadcast channel, a control signal (L1/L2 control signal) and a data signal and the like. For simplifying the figure, functional components for the data signal is not shown. The reception RF unit 201 receives the control signal at a discontinuous reception timing in a discontinuous reception mode. The discontinuous reception information (DRX information) such as discontinuous reception timing, discontinuous cycle, time period for performing discontinuous reception, duty ratio and the like may be determined in the system beforehand, or may be reported from the base station apparatus. The parameters for discontinuous reception are received by the L1/L2 processing unit 203 (when discontinuous reception parameters are controlled by MAC control PDU) or by the RRC processing unit 205 (when discontinuous reception parameters are controlled by RRC message), so that active and stop timing is set according to the values indicated by the parameters.

The L1/L2 processing unit 203 demodulates a low layer control signal (L1/L2 control signal) related to the physical layer, and extracts assignment information of radio resources, high layer control information (L3 control message, RRC measurement control message), acknowledgement information (ACK/NACK) of an uplink data signal that was sent before, and the like. The L1/L2 processing unit 203 may be also called a MAC processing unit.

The RRC processing unit 205 extracts information on radio resource control (RRC). The RRC processing unit 205 extracts and prepares various pieces of information necessary for operation such as establishment, reestablishment, maintenance and release of RRC connection, establishment, change and release of radio bearer, assignment of radio resources, operation mode management of active and idle, and move management of connection. For example, the RRC processing unit 205 prepares an RRC connection request signal according to paging (incoming) using a paging channel or user's calling operation. In addition, after receiving an RRC release signal indicating release of connection, the RRC processing unit 205 prepares an RRC release complete signal in response to the RRC release signal. In addition, the RRC processing unit 205 sets measurement necessary for low layer according to a measurement control signal specified from the base station apparatus, and prepares a measurement report signal when an event that should be reported to the base station apparatus occurs.

The control apparatus 207 controls operation of each function element based on various types of information reported from the RRC processing unit 205.

The measurement unit 209 performs sell search using a specified frequency. The frequency to be specified may be a frequency that is used in a residing cell, and also may be a frequency different from the frequency that is used in the residing cell. In the cell search, received quality of a reference signal from neighbor cells is measured. The different frequency measurement is performed when an event for different frequency measurement occurs during the discontinuous reception timing interval for the control signal.

The transmission RF unit 211 generates an uplink signal including an uplink control signal, an uplink shared data channel (PUSCH) and the like. The uplink signal is transmitted via the duplexer and the antenna after various processes are performed in the transmission RF unit 211. These processes include processes such as digital analog conversion, modulation, frequency conversion, band limitation, power amplification and the like.

Processes especially related to the present invention among various processes performed by the RRC processing unit 205 and the measurement unit 209 are measuring instantaneous quality of the downlink reference signal, averaging instantaneous quality measurement values, detecting occurrence of a predetermined event, performing processes (described later) according to a result of comparison with the threshold on the discontinuous reception cycle and the discontinuous reception cycle which is currently set in the own apparatus.

The quality of the signal may be measured as desired signal power to interference signal power ratio (SIR, SINR and the like), reference signal received power (RSRP), channel quality indicator (CQI), path loss and the like. Averaging of the quality measurement values is performed for removing effect of instantaneous fading to the extent of following shadowing and the like. The predetermined event is performed by comparing a measurement value based on a received signal with a predetermined threshold, and by checking whether the value is greater or less than the threshold.

Figure 4:
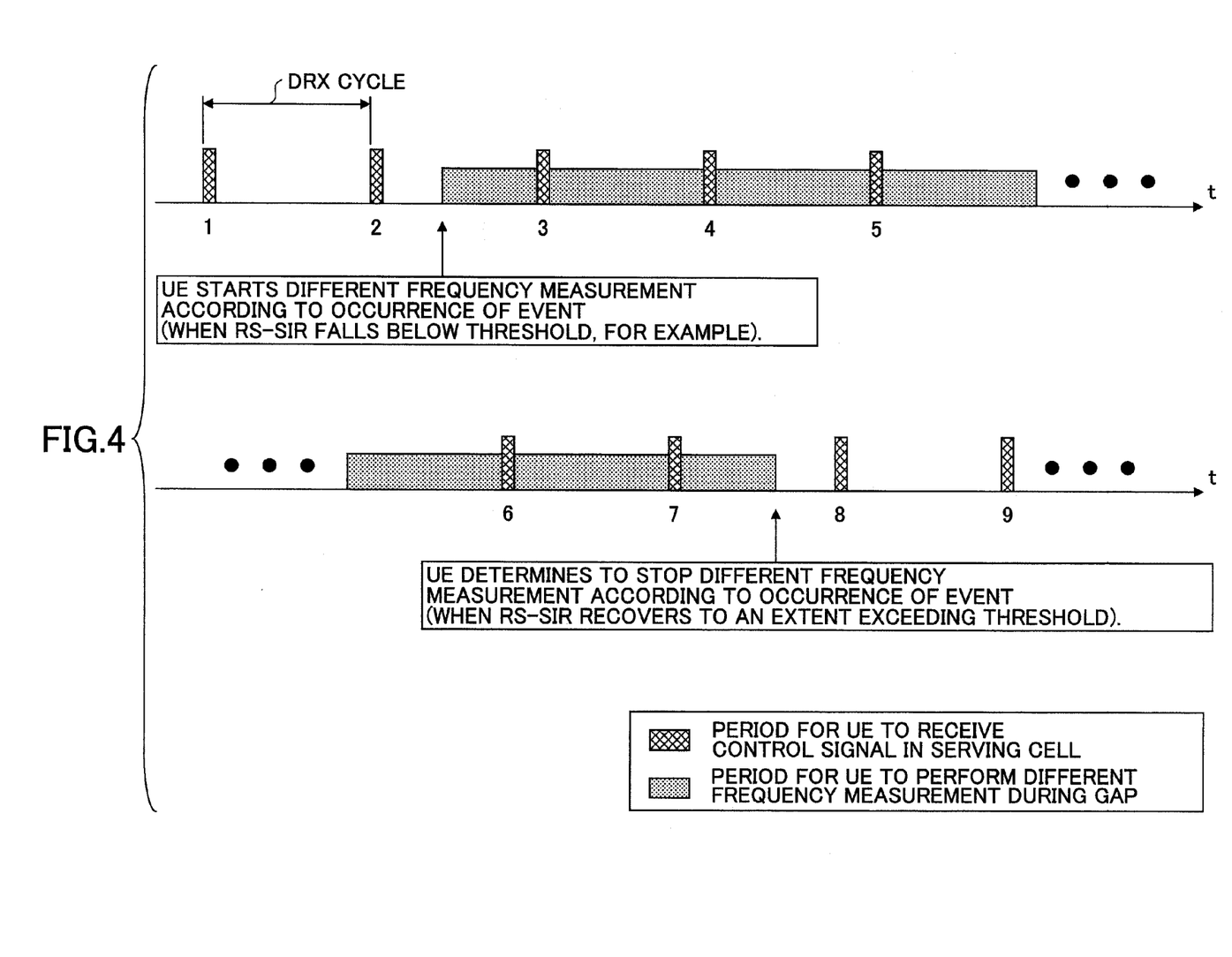
FIG. 4 shows a timing chart (1) for explaining an operation example of the present invention.

FIG. 4 shows a timing chart (1) for explaining an operation example of the present invention. Of course, the user apparatus performs discontinuous reception of the control signal in the idle mode, and, in addition to that, the user apparatus also performs discontinuous reception of the control signal even in an active mode according to data activity. The user apparatus performs different frequency measurement as necessary between timings of reception of the control signal (downlink L1/L2 control signal). The different frequency measurement is performed in response to occurrence of a predetermined event. In the different frequency measurement, the user apparatus tunes to a frequency different from the frequency of the residing cell, detects a synchronization channel by performing cell search, performs measurement of reception level, and tunes to a frequency of the residing cell again. Accordingly, it is checked whether there is a connectable different frequency cell near the residing cell.

In the mobile communication system of the present embodiment, a reception timing interval (DRX cycle) for the control signal in the user apparatus is used as it is or the DRX cycle is corrected depending on whether the DRX cycle is longer than a threshold (DRX threshold) specified by the base station apparatus. The example shown in FIG. 4 shows an operation example in which the DRX cycle of the user apparatus is longer than the DRX threshold (A case in which DRX cycle is not longer than DRX threshold is described with reference to FIG. 5). As an example, the DRX threshold is 10 ms, and the DRX cycle shown in FIG. 4 is 100 ms. The value of the DRX threshold and information indicating how the event for different frequency measurement should be determined are reported from the base station apparatus to the user apparatus using a measurement control message of the RRC protocol layer transmitted by the broadcast channel or the individual channel, for example.

FIG. 4 shows nine active timings of the user apparatus in order. The time interval between active timings corresponds to discontinuous transmission cycle (DTX cycle) of a control signal from the base station apparatus or a discontinuous reception cycle (DRX cycle) of the control signal in the user apparatus. In each active timing, the user apparatus checks whether an event of the different frequency measurement has occurred. At the first and the second active timing, such event does not occur. However, the event for the different frequency measurement occurs between the second and the third active timings, so that the user apparatus starts different frequency measurement. The different frequency measurement is performed between active timings. Further, when an event for stopping the different frequency measurement occurs, the user apparatus stops different frequency measurement during the discontinuous reception cycle. In FIG. 4, such an event occurs between the seventh and eighth active timings, so that the user apparatus stops the different frequency measurement.

The event for starting or stopping different frequency measurement may be determined according to a result of comparison between a predetermine threshold and desired signal power to non-desired signal power ratio (RS-SIR etc.) of the downlink reference signal, or received power (RS-RP) of the downlink reference signal, or average value of CQI or path loss, for example. For example, the different frequency measurement may start in response to an event that SIR (RS-SIR) of the reference signal in the serving cell becomes lower than the threshold. This event usually occurs when the user apparatus moves closer to a cell end. In addition, different frequency measurement may be terminated when RS-SIR in the serving cell becomes above the threshold. This event usually occurs when the user apparatus moves closer to the base station apparatus. The threshold used for start of measurement and the threshold used for stop may be the same or may be different. For example, when using RS-SIR for determination, it is desirable to set the stop threshold to be higher than the start threshold. Accordingly, frequent switching between start and stop of measurement can be avoided.

It is necessary that the discontinuous transmission cycle (DTX cycle) for the control signal in the base station apparatus agrees with the discontinuous reception cycle (DRX cycle) of the user apparatus. In the example shown in FIG. 4, the DRX cycle of the user apparatus known by the base station apparatus is longer than the DRX threshold, so that the DRX cycle is used in the user apparatus as it is. It is not necessary that the base station apparatus ascertains what the user apparatus is doing during the interval of the discontinuous active timings of the user apparatus. Therefore, it is not necessary that the base station apparatus ascertains that an event for different frequency measurement occurs in the user apparatus. This means that it is not essential to transmit a signal like a measurement report indicating that the event for different frequency measurement occurs from the user apparatus to the base station apparatus (the signal may be transmitted, but it may not be transmitted from the viewpoint of saving resources). Accordingly, the point that an event for which any report to the base station apparatus is not necessary is defined in the RRC layer is one of points different from conventional processing.

In the example shown in the figure, the user apparatus autonomously performs different frequency measurement in response to the occurrence of an event for different frequency measurement, and autonomously stops different frequency measurement in response to occurrence of an event for stopping it. When an event for performing handover to a different frequency cell occurs following the different frequency measurement, the user apparatus sends a measurement report for reporting it to the base station apparatus. The even for handover to the different frequency cell may be an event arising when measured RS-SIR of the different frequency cell becomes equal to or greater than a predetermined threshold, or may be an event arising when the RS-SIR of the different frequency cell becomes equal to or greater than RS-SIR of the serving cell by a predetermined threshold.

Figure 5:
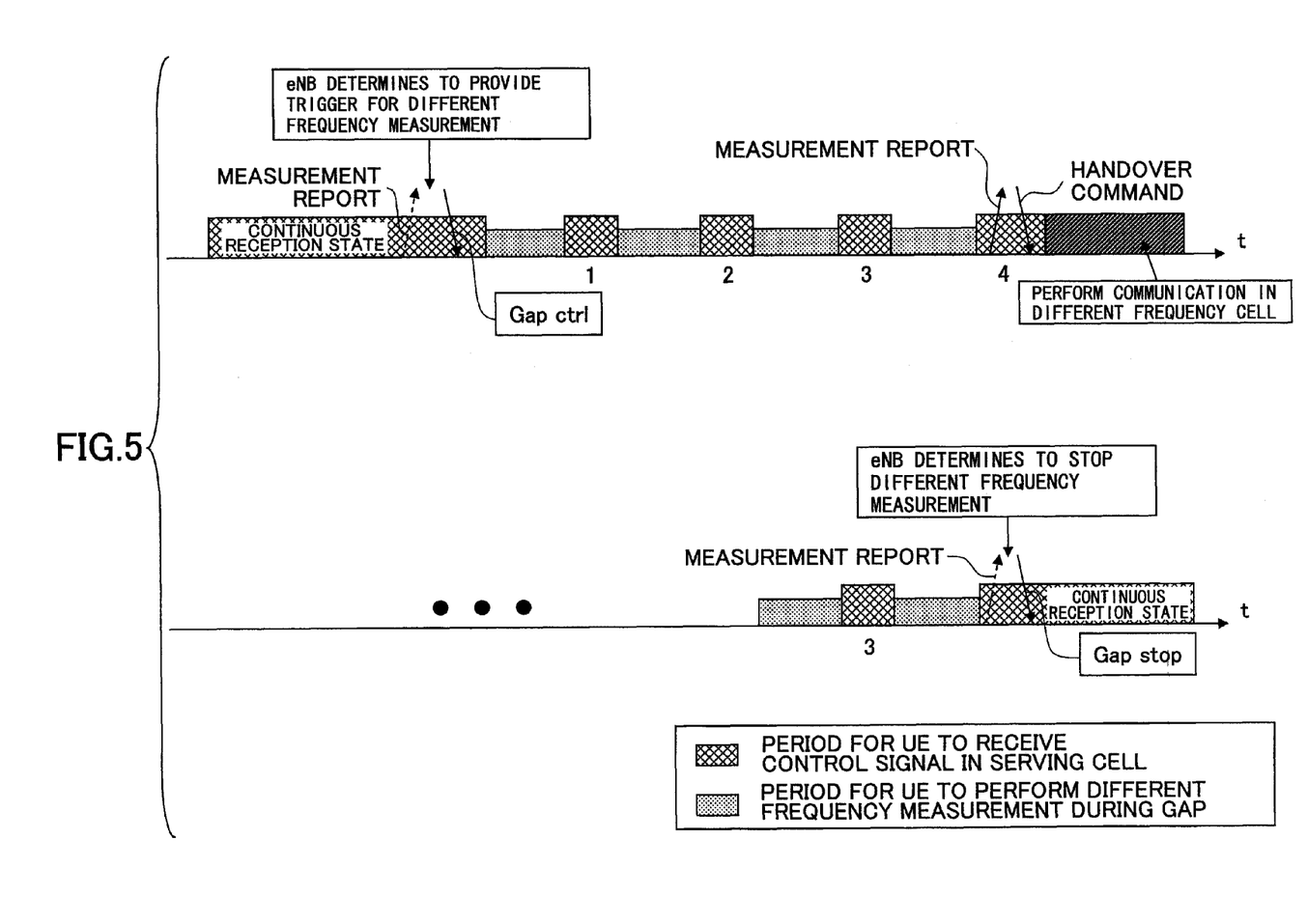
FIG. 5 shows a timing chart (2) for explaining an operation example of the present invention.

FIG. 5 is a timing chart (2) for explaining an operation example of the present invention. The example of FIG. 5 shows an operation example in which the reception timing interval of the user apparatus is not longer than the DRX threshold. The case in which the reception timing interval of the user apparatus is not longer than the DRX threshold includes not only a case in which the discontinuous reception cycle (3 ms, for example) is set to be shorter than the DRX threshold (10 ms, for example) but also includes a case in which discontinuous reception is not performed. A typical example of the latter case is that the user apparatus continuously receives a downlink control signal for each subframe (for each 1 ms, for example) so as to communicate a downlink or uplink data signal. The reception timing interval of the L1/L2 control signal for each subframe is obviously shorter than the DRX threshold. Even in such a case, when the user apparatus moves closer to a cell end, for example, an event for different frequency measurement may occur. In order for the user apparatus to perform different frequency measurement, the user apparatus needs to perform discontinuous communication in an adequately long DRX cycle. In addition to that, it is necessary that the DRX cycle is already known by the base station apparatus.

In the operation example shown in FIG. 5, the base station apparatus sends a gap control signal (Gap ctrl) to the user apparatus in response to occurrence of the event for different frequency measurement such that proper discontinuous communication is performed.

The event for different frequency measurement may be identified by the user apparatus and reported to the base station apparatus (1), or may be identified by the base station apparatus without such report (2). In the former case, by performing processing described with reference to FIG. 4, the occurrence of the event can be identified. But, when the event for different frequency measurement is identified using the method of (1), the user apparatus should send a measurement report indicating that to the base station apparatus.

In the latter case (2), the base station apparatus may determine whether the event has occurred based on a result of comparison between a predetermined threshold, and quality (RS-SIR etc.) of uplink reference signal, received power (RS-RP) of uplink reference signal, average value of CQI of downlink (reported from user apparatus) or path loss. In addition, downlink transmission power, error rate of communication signal, number of times of retransmission, MCS (combination of data modulation scheme and channel coding rate) and the like may be taken into consideration for event determination. When the event for different frequency measurement is identified using the method of (2), it is not essential that a measurement report indicating the occurrence of the event is reported from the user apparatus to the base station apparatus.

The gap control signal (gap ctrl) may include various parameter values concretely indicating the discontinuous reception method that the user apparatus should execute. The parameter values may include discontinuous reception cycle (DRX cycle), duty ratio, discontinuous period, active period and the like, for example. Or, the gap control signal may only represent whether predetermined discontinuous reception should be performed without including the parameter values into the gap control signal in which the parameter values are commonly used in the system or the cell (in this case, it is only necessary that the gap control signal has one bit in principle).

For example, discontinuous communication performed according to the instruction (gap control signal) from the base station apparatus has a discontinuous period of 10 ms and an active period of 10 ms. In addition, the gap control signal may be transmitted as a RRC message or as a MAC control PDU. For example, as for LTE, since discontinuous reception has an effect on radio resource assignment, that is, scheduling in the base station, gap control may be processed in the MAC protocol layer that controls scheduling. On the other hand, when using the RRC message, retransmission function or security function of the RLS protocol layer can be used.

In the figure, data communication is performed in each active period of 10 ms shown as 1, 2, 3 and 4, and different frequency measurement is performed during each discontinuous period between the active periods. In the example shown in the upper side of FIG. 5, after different frequency measurement, an event for handover occurs, and a measurement report for handover is sent to the base station apparatus in the fourth active period. In response to the measurement report, the base station apparatus reports a handover command to the user apparatus. According to the handover command, the user apparatus connects to a cell detected by the different frequency measurement and restarts continuous data communication.

In the example shown in the lower side of FIG. 5, an event for stopping different frequency measurement occurs (an event for handover does not occur), and a measurement report indicating the event is reported to the base station apparatus. The base station apparatus sends a gap stop signal for the user apparatus to stop different frequency measurement. In response to the gap stop signal, the user apparatus restarts continuous data communication after that. The situation shown in the lower side of FIG. 5 usually occurs when the user apparatus comes closer to the base station apparatus again after the user apparatus moves closer to the cell end.

Even when the DRX cycle of the user apparatus is not longer than the DRX threshold, the user apparatus may perform discontinuous reception using a DRX cycle shorter than the DRX threshold if the event for different frequency measurement is not occurring.

In the above description, although the DRX cycle is described as an interval between timings at which the control signal is received, the present invention can be similarly applied even when the DRX cycle is defined as a gap period from a timing when reception of the control signal ends to a timing when reception of next control signal starts.

In addition, when the user apparatus autonomously updates the DRX cycle based on data activity according to a predetermined rule (specified from the base station apparatus), the present invention can be also applied by comparing the updated DRX cycle with the DRX threshold.

[Embodiment 2]

Since different frequency measurement is performed during the interval (gap interval) of reception of the control signal by the user apparatus, it is necessary to properly detect a synchronization channel of the different frequency cell during the gap interval.

Figure 6:
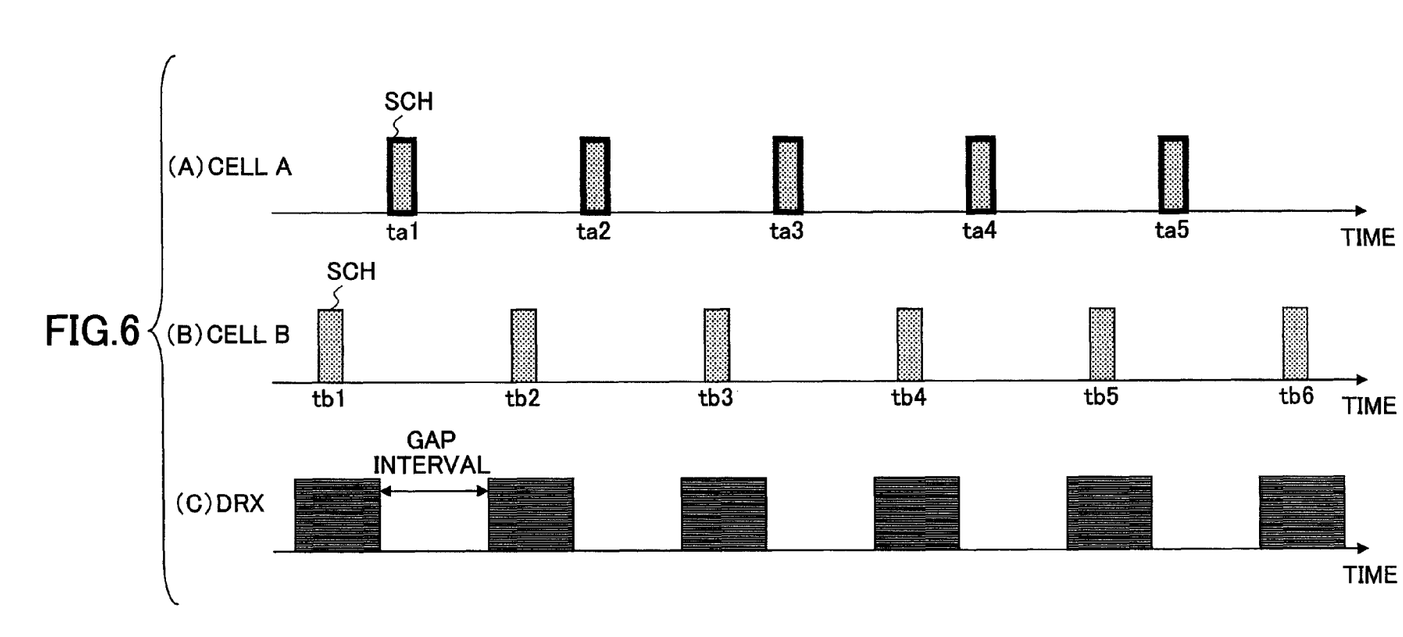
FIG. 6 is a figure showing a situation in which gap interval is not proper.

FIG. 6 shows an example of relationship among transmission timing of the synchronization channel SCH of cells A and B using different frequencies, active period and gap interval in the user apparatus. In the example shown in the figure, the user apparatus performs different frequency measurement during the gap interval so that the user apparatus can properly detect a synchronization channel SCH of the different frequency cell A.

However, since a synchronization channel SCH of another different frequency cell B is not sent during the gap interval of the user apparatus, it is not possible to detect it. In the example shown in FIG. 6, although the cell A can be found by the different frequency measurement, the cell B cannot be found. In the figure, the synchronization channel indicated by a thick frame is indicated as the synchronization channel that can be detected by the user apparatus. Even if the cell B is an optimum handover destination for the user apparatus, the user apparatus cannot move to the cell B, which is not preferable in view of system capacity and the like.

When the gap interval is long enough, the above-mentioned problem can be avoided. But, when the gap interval is short or when data communication is being performed, the above-mentioned problem may occur.

Figure 7:
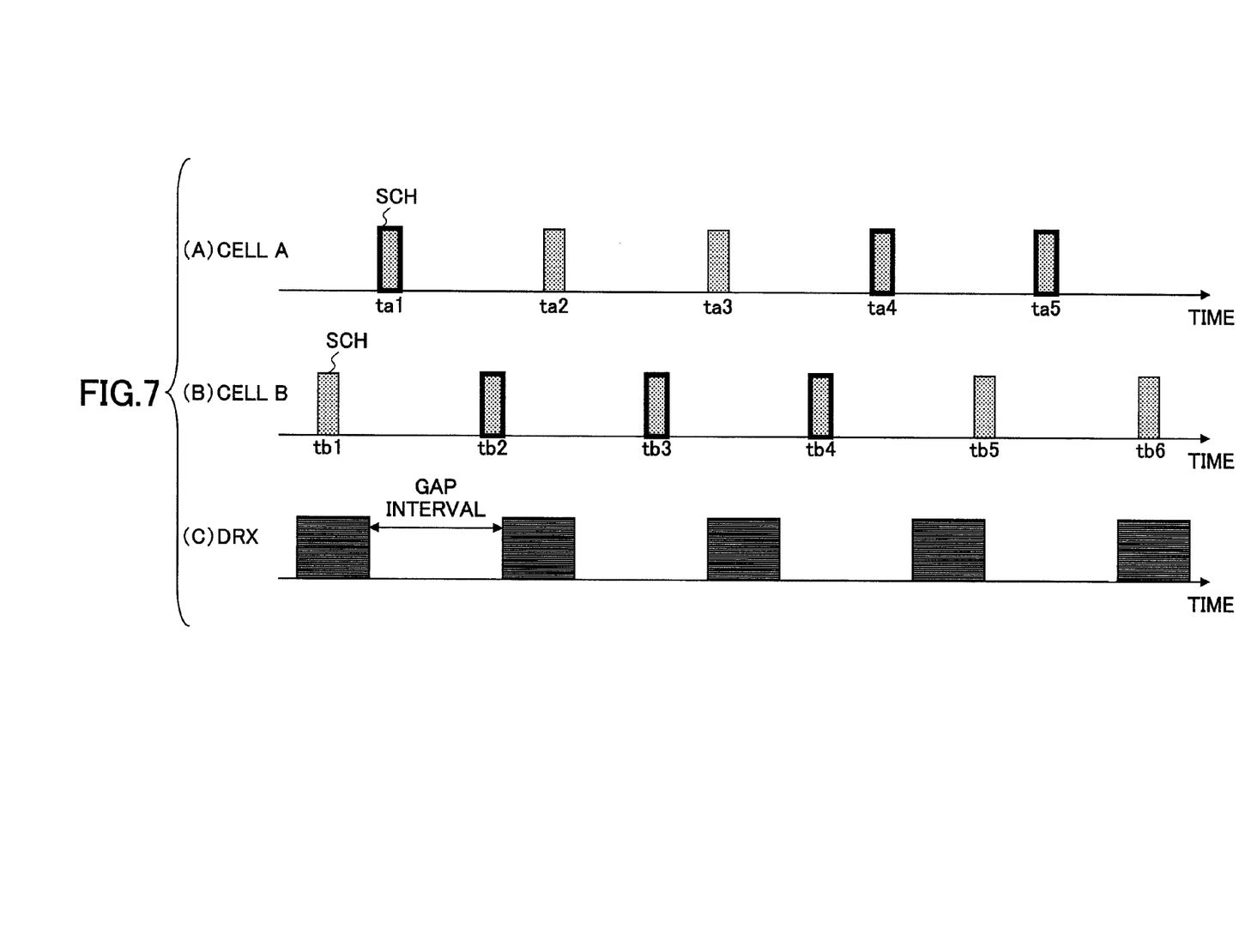
FIG. 7 is a FIG. 1) showing a situation in which gap interval is proper.

FIG. 7 shows a method for addressing the problem. In the case when the base station apparatus sends a gap control signal so that the user apparatus is caused to perform discontinuous reception, the gap interval is set such that all of synchronization channels SCH of different frequency neighbor cells around the residing cell can be detected. Each synchronization channel indicated by a thick frame in FIG. 7 can be identified by the user apparatus.

More concretely, the user apparatus can identify the synchronization channel SCH of the different frequency cell A of the timing ta1, ta4 and ta5, and the synchronization channel SCH of the different frequency cell B of the timing tb2, tb3 and tb4. The base station apparatus of the residing cell or the upper apparatus determines the gap interval in order to construct proper relationship between the transmission timings of the synchronization channels SCH of the different frequency cells around the residing cell and the gap interval in the residing cell. More particularly, assuming that transmission timing t of the synchronization channel that should be detected in different frequency measurement is represented as $(t=N \times T_{SCH}+b)$ (in which N is an integer, $T_{SCH}$ is a transmission cycle of the synchronization channel, and b is an offset), the active period is set such that the timing is included in the gap interval or the active period is set such that the timing is avoided. In the example shown in FIG. 7, the active period is determined such that both of timings $(N \times T_{SCH-A}+b_A)$ and $(M \times T_{SCH-B} b_B)$ are included in the gap interval or such that these timings are excluded from the active period. N and M are integers, $T_{SCH-A}$ and $T_{SCH-B}$ are transmission cycles of synchronization channels of different frequency cells A and B, and $b_A$ and $b_B$ are offsets.

Figure 8:
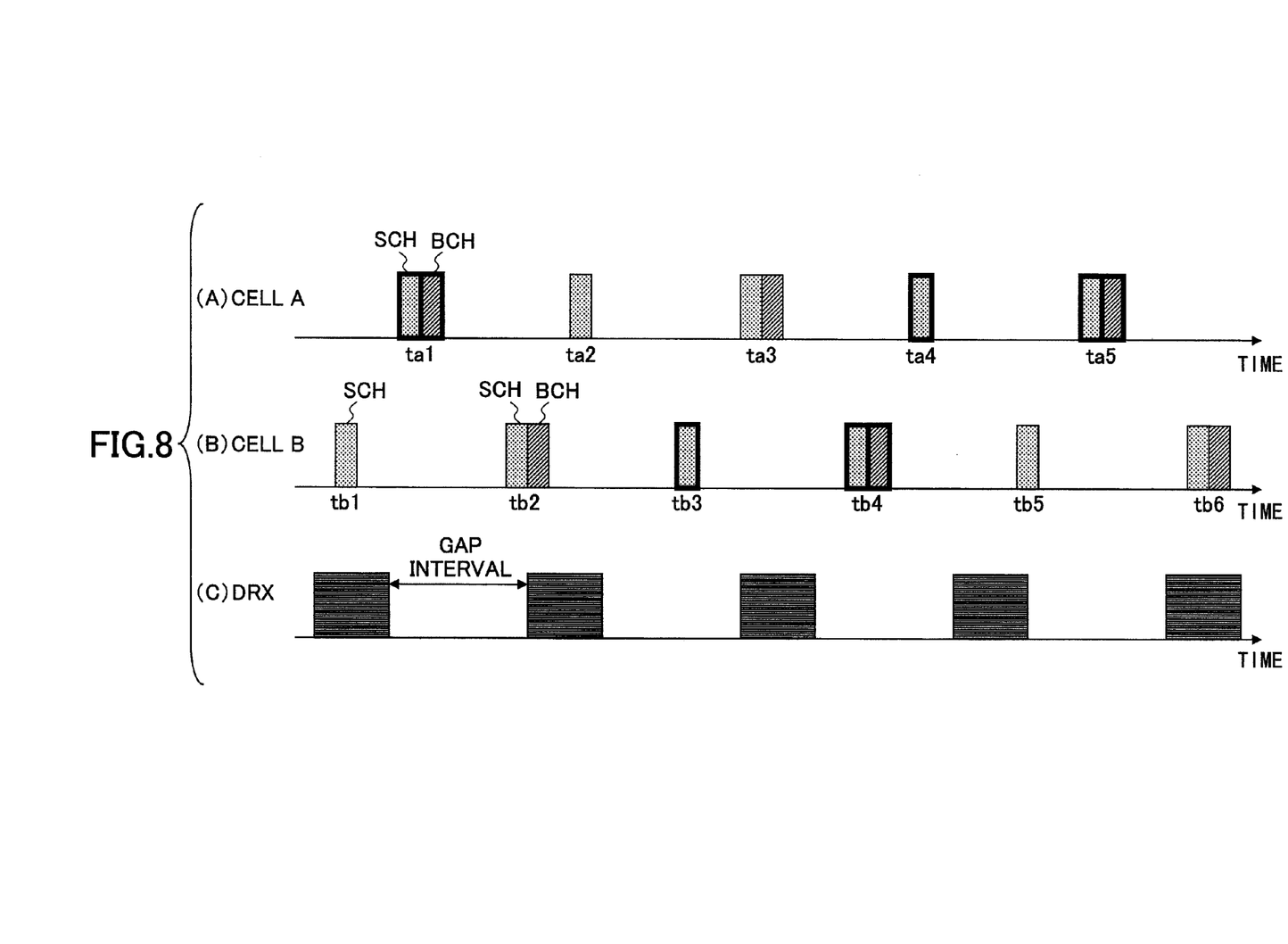
FIG. 8 is a FIG. 2) showing a situation in which gap interval is proper.

As shown in FIG. 8, channels configured to be surely detected in the gap interval may include not only the synchronization channel SCH, but also broadcast channel BCH, and also another channel may be considered. In the example shown in the figure, in different frequency measurement, the user apparatus can properly identify the synchronization channel SCH and the broadcast channel BCH of the different frequency cell A that are transmitted at the timing ta1, the synchronization channel SCH of the different frequency cell B that is transmitted at the timing tb3, the synchronization channel SCH and the broadcast channel BCH of the different frequency cell B that are transmitted at the timing tb4, the synchronization channel SCH of the different frequency cell A that is transmitted at the timing ta4, and the synchronization channel SCH and the broadcast channel BCH of the different frequency cell A that is transmitted at the timing ta5.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. Classification into each embodiment is not essential in the present invention, and equal to or more than two embodiments may be used as necessary. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese patent application No. 2007-073737, filed in the JPO on Mar. 20, 2007 and the entire contents of the Japanese patent application No. 2007-073737 are incorporated herein by reference.

The invention claimed is:

1. A user apparatus for use in a mobile communication system, comprising:
   a unit configured to receive a downlink control signal using a frequency of a residing cell; and
   a measurement unit configured to perform cell search using a frequency different from the frequency of the residing cell during an interval between reception timings of the downlink control signal in response to an occurrence of a predetermined event for different frequency measurement in the user apparatus or a base station apparatus,
   wherein the measurement unit does not perform different frequency measurement while receiving the downlink control signal,
   wherein, when a reception timing interval of the downlink control signal is longer than a threshold reported from the base station apparatus, the measurement unit performs different frequency measurement during the reception timing interval,
   wherein when the reception timing interval of the downlink control signal is not longer than the threshold, the measurement unit performs different frequency measurement during a discontinuous reception cycle that is longer than the reception timing interval and that is reported from the base station apparatus, and
   wherein, when the reception timing interval of the downlink control signal is shorter than the threshold reported from the base station apparatus, and when the predetermined event for different frequency measurement occurs in the user apparatus or in the base station apparatus, different frequency measurement is performed in a cycle reported from the base station apparatus;
   wherein it is determined by the base station apparatus that the predetermined event for the different frequency measurement occurs, and a measurement report for urging start of different frequency measurement is not transmitted to the base station apparatus.

2. A user apparatus for use in a mobile communication system, comprising:
   a unit configured downlink control signal using a frequency of a residing cell; and
   a measurement unit configured to perform cell search using a frequency different from the frequency of the residing cell during an interval between reception timings of the downlink control signal in response to an occurrence of a predetermined event for different frequency measurement in the user apparatus or a base station apparatus, wherein the measurement unit does not perform different frequency measurement while receiving the downlink control signal, wherein, when a reception timing interval of the downlink control signal is longer than a threshold reported from the base station apparatus, the measurement unit performs different frequency measurement during the reception timing interval, wherein when the reception timing interval of the downlink control signal is not longer than the threshold, the measurement unit performs different frequency measurement during a discontinuous reception cycle that is longer than the reception timing interval and that is reported from the base station apparatus, wherein, when the reception timing interval of the downlink control signal is shorter than the threshold reported from the base station apparatus, and when the predetermined event for different frequency measurement occurs in the user apparatus or in the base station apparatus, different frequency measurement is performed in a cycle reported from the base station apparatus, and wherein it is determined by the user apparatus that the predetermined event for the different frequency measurement occurs, and information indicating what the predetermined event is is transmitted by using a RRC measurement control, a broadcast channel or an individual channel.

3. The user apparatus as claimed in claim 2, wherein the predetermined event is defined by a result of comparison between a predetermined threshold and desired signal power to non-desired signal power ratio of the downlink reference signal, received power of the downlink reference signal, path loss or an average value of CQI.

4. A user apparatus for use in a mobile communication system, comprising:

a unit configured to receive a downlink control signal using a frequency of a residing cell; and a measurement unit configured to perform cell search using a frequency different from the frequency of the residing cell during an interval between reception timings of the downlink control signal in response to an occurrence of a predetermined event for different frequency measurement in the user apparatus or a base station apparatus, wherein the measurement unit does not perform different frequency measurement while receiving the downlink control signal, wherein, when a reception timing interval of the downlink control signal is longer than a threshold reported from the base station apparatus, the measurement unit performs different frequency measurement during the reception timing interval, wherein when the reception timing interval of the downlink control signal is not longer than the threshold, the measurement unit performs different frequency measurement during a discontinuous reception cycle that is longer than the reception timing interval and that is reported from the base station apparatus, wherein, when the reception timing interval of the downlink control signal is shorter than the threshold reported from the base station apparatus, and when the predetermined event for different frequency measurement occurs in the user apparatus or in the base station apparatus, different frequency measurement is performed in a cycle reported from the base station apparatus, and wherein a gap control signal for causing the user apparatus to start different frequency measurement is reported from the base station apparatus.

5. A user apparatus for use in a mobile communication system, comprising:

a unit configured to receive a downlink control signal using a frequency of a residing cell; and a measurement unit configured to perform cell search using a frequency different from the frequency of the residing cell during an interval between reception timings of the downlink control signal in response to an occurrence of a predetermined event for different frequency measurement in the user apparatus or a base station apparatus, wherein the measurement unit does not perform different frequency measurement while receiving the downlink control signal, wherein, when a reception timing interval of the downlink control signal is longer than a threshold reported from the base station apparatus, the measurement unit performs different frequency measurement during the reception timing interval, wherein when the reception timing interval of the downlink control signal is not long than the threshold, the measurement unit performs different frequency measurement during a discontinuous reception cycle that is longer than the reception timing interval and that is reported from the base station apparatus, wherein, when the reception timing interval of the downlink control signal is shorter than the threshold reported from the base station apparatus, and when the predetermined event for different frequency measurement occurs in the user apparatus or in the base station apparatus, different frequency measurement is performed in a cycle reported from the base station apparatus, and wherein a gap stop signal for causing the user apparatus to stop different frequency measurement is reported from the base station apparatus.

6. A method for use of a user apparatus of a mobile communication system, comprising:

a step of configuring a unit to receive a downlink control signal using a frequency of a residing cell; and a step of configuring a measurement unit to perform cell search using a frequency different from the frequency of the residing cell during an interval between reception timings of the downlink control signal in response to an occurrence of a predetermined event for different frequency measurement in the user apparatus or a base station apparatus, wherein the measurement unit does not perform different frequency measurement while receiving the downlink control signal, wherein, when a reception timing interval of the downlink control signal is longer than a threshold reported from the base station apparatus, the measurement unit performs different frequency measurement during the reception timing interval, wherein when the reception timing interval of the downlink control signal is not longer than the threshold, the measurement unit performs different frequency measurement during a discontinuous reception cycle that is longer than the reception timing interval and that is reported from the base station apparatus, wherein, when the reception timing interval of the downlink control signal is shorter than the threshold reported from the base station apparatus, and when the predetermined event for different frequency measurement occurs in the user apparatus or in the base station apparatus, different frequency measurement is performed in a cycle reported from the base station apparatus, and wherein it is determined by the base station apparatus that the predetermined event for the different frequency measurement occurs, and a measurement report for urging start of different frequency measurement is not transmitted to the base station apparatus.

7. A method for use of a user apparatus of a mobile communication system, comprising:

a step of configuring a unit to receive a downlink control signal using a frequency of a residing cell; and a step of configuring a measurement unit to perform cell search using a frequency different from the frequency of the residing cell during an interval between reception timings of the downlink control signal in response to an occurrence of a predetermined event for different frequency measurement in the user apparatus or a base station apparatus, wherein the measurement unit does not perform different frequency measurement while receiving the downlink control signal, wherein, when a reception timing interval of the downlink control signal is longer than a threshold reported from the base station apparatus, the measurement unit performs different frequency measurement during the reception timing interval, wherein when the reception timing interval of the downlink control signal is not longer than the threshold, the measurement unit performs different frequency measurement during a discontinuous reception cycle that is longer than the reception timing interval and that is reported from the base station apparatus, wherein, when the reception timing interval of the downlink control signal is shorter than the threshold reported from the base station apparatus, and when the predetermined event for different frequency measurement occurs in the user apparatus or in the base station apparatus, different frequency measurement is performed in a cycle reported from the base station apparatus, and wherein it is is determined by the user apparatus that the predetermined event for the different frequency measurement occurs, and information indicating what the predetermined event is transmitted by using a RRC measurement control, a broadcast channel or an individual channel.

8. The method as claimed in claim 7, wherein the predetermined event is defined by a result of comparison between a predetermined threshold and desired signal power to non-desired signal power ratio of the downlink reference signal, received power of the downlink reference signal, path loss or an average value of CQI.

9. A method for use of a user apparatus of a mobile communication system, comprising:

a step of configuring a unit to receive a downlink control signal using a frequency of a residing cell; and a step of configuring a measurement unit to perform cell search using a frequency different from the frequency of the residing cell during an interval between reception timings of the downlink control signal in response to an occurrence of a predetermined event for different frequency measurement in the user apparatus or a base station apparatus, wherein the measurement unit does not perform different frequency measurement while receiving the downlink control signal, wherein, when a reception timing interval of the downlink control signal is longer than a threshold reported from the base station apparatus, the measurement unit performs different frequency measurement during the reception timing interval, wherein when the reception timing interval of the downlink control signal is not longer than the threshold, the measurement unit performs different frequency measurement during a discontinuous reception cycle that is longer than the reception timing interval and that is reported from the base station apparatus, wherein, when the reception timing interval of the downlink control signal is shorter than the threshold reported from the base station apparatus, and when the predetermined event for different frequency measurement occurs in the user apparatus or in the base station apparatus, different frequency measurement is performed in a cycle reported from the base station apparatus, and wherein a gap control signal for causing the user apparatus to start different frequency measurement is reported from the base station apparatus.

10. A method for use of a user apparatus of a mobile communication system, comprising:

a step of configuring a unit to receive a downlink control signal using a frequency of a residing cell; and a step of configuring a measurement unit to perform cell search using a frequency different from the frequency of the residing cell during an interval between reception timings of the downlink control signal in response to an occurrence of a predetermined event for different frequency measurement in the user apparatus or a base station apparatus, wherein the measurement unit does not perform different frequency measurement while receiving the downlink control signal, wherein, when a reception timing interval of the downlink control signal is longer than a threshold reported from the base station apparatus, the measurement unit performs different frequency measurement during the reception timing interval, wherein when the reception timing interval of the downlink control signal is not longer than the threshold, the measurement unit performs different frequency measurement during a discontinuous reception cycle that is longer than the reception timing interval and that is reported from the base station apparatus, wherein, when the reception timing interval of the downlink control signal is shorter than the threshold reported from the base station apparatus, and when the predetermined event for different frequency measurement occurs in the user apparatus or in the base station apparatus, different frequency measurement is performed in a cycle reported from the base station apparatus, and wherein a gap stop signal for causing the user apparatus to stop different frequency measurement is reported from the base station apparatus.

* * * * *